(12) United States Patent
Miller et al.

(10) Patent No.: US 8,954,736 B2
(45) Date of Patent: Feb. 10, 2015

(54) LIMITING THE FUNCTIONALITY OF A SOFTWARE PROGRAM BASED ON A SECURITY MODEL

(71) Applicant: Google Inc., Mountain View, CA (US)

(72) Inventors: James Brooks Miller, Mountain View, CA (US); Daniel Marc Gatan Shiplacoff, Mountain View, CA (US)

(*) Notice: Subject to any disclaimer, the term of this patent is extended or adjusted under 35 U.S.C. 154(b) by 0 days.

(21) Appl. No.: 13/709,634

(22) Filed: Dec. 10, 2012

(65) Prior Publication Data

US 2014/0101768 A1 Apr. 10, 2014

Related U.S. Application Data

(60) Provisional application No. 61/709,778, filed on Oct. 4, 2012.

(51) Int. Cl.
  H04L 29/06 (2006.01)
  G06F 21/53 (2013.01)
  G06F 21/51 (2013.01)
  G06F 21/50 (2013.01)

(52) U.S. Cl.
  CPC ............... *G06F 21/50* (2013.01); *G06F 21/53* (2013.01); *G06F 21/51* (2013.01)
  USPC ............... 713/166; 713/168; 726/27; 726/28; 726/29; 726/30

(58) Field of Classification Search
  USPC ............................. 726/27–30; 713/166, 168
  See application file for complete search history.

(56) References Cited

U.S. PATENT DOCUMENTS

| | | | |
|---|---|---|---|
| 7,743,407 B2 | 6/2010 | Sprigg et al. | |
| 8,249,558 B2* | 8/2012 | Olsen et al. | 455/411 |
| 8,756,704 B2* | 6/2014 | Castellucci et al. | 726/28 |
| 2004/0203895 A1* | 10/2004 | Balasuriya | 455/456.1 |
| 2006/0143715 A1 | 6/2006 | Chow et al. | |
| 2006/0277469 A1 | 12/2006 | Chaudhri | |
| 2007/0136207 A1* | 6/2007 | Davydov et al. | 705/57 |
| 2010/0197352 A1* | 8/2010 | Runstedler et al. | 455/566 |
| 2010/0242097 A1 | 9/2010 | Hotes et al. | |
| 2010/0251340 A1 | 9/2010 | Martin et al. | |
| 2011/0047368 A1* | 2/2011 | Sundaramurthy et al. | 713/100 |
| 2011/0154481 A1 | 6/2011 | Kilgore | |

FOREIGN PATENT DOCUMENTS

| | | |
|---|---|---|
| JP | 2008021021 A | 1/2008 |
| JP | 2008299776 A | 12/2008 |
| KR | 1020070119495 A | 12/2007 |

OTHER PUBLICATIONS

International Search Report for PCT/US2013/061792 dated Feb. 28, 2014.
Atwood, Jeff, "Windows Vista: Security Through Endless Warning Dialogs," www.codinghorror.com. Apr. 19, 2006.
Savill, John, "What is Windows Vista User Account Protection (UAP)?," www.windowsitpro.com. Sep. 10, 2005.
Windows Vista—User Account Protection (UAP). www.computerperformance.co.uk/vista/user_account_protection.htm. Printed on Sep. 13, 2012.
Iizuka, Takuya, et al., "A Design of local resource access control for mobile agent in PDA," IEICE Trans. Commun., vol. E84-B, No. 11, Nov. 2001.

* cited by examiner

*Primary Examiner* — Josnel Jeudy

(57) ABSTRACT

Systems, methods, routines and/or techniques for limiting the functionality of a software program based on a security model are described. One or more embodiments may include limiting the functionality of a software program (e.g., a widget) based on one or more operations that the widget intends to take. One or more embodiments may include limiting the functionality of a widget that is located on and/or accessible via a lock screen of a mobile device. One or more embodiments may include preventing a widget from causing an application to perform sensitive actions when a system is in an un-authenticated state. One or more embodiments may include preventing a widget from installing and/or displaying on a particular screen of a mobile device (e.g., a lock screen) if the widget includes a function that indicates that a sensitive operation will be taken.

20 Claims, 7 Drawing Sheets

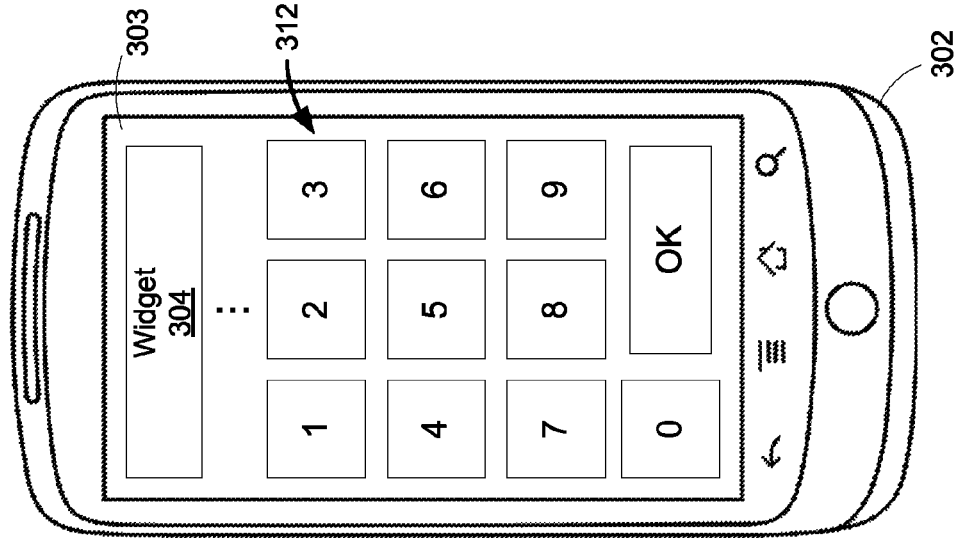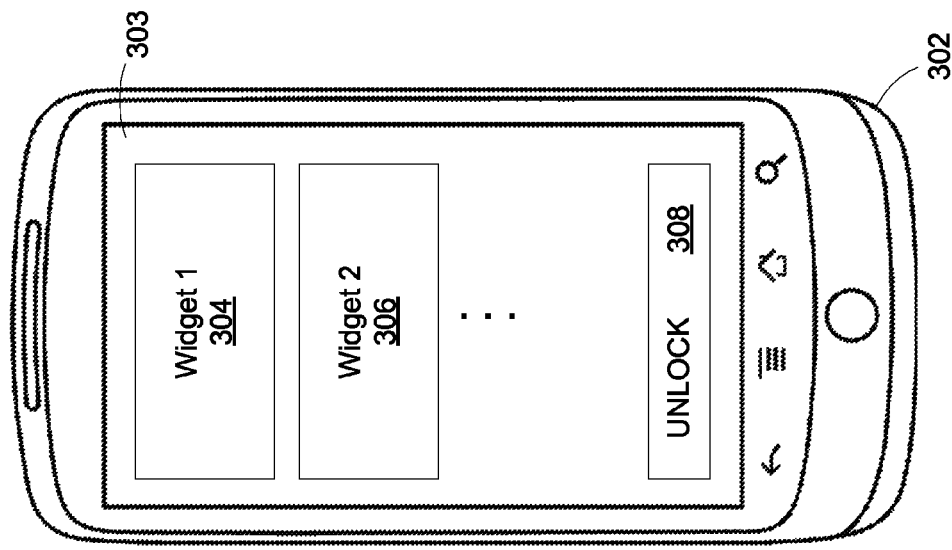

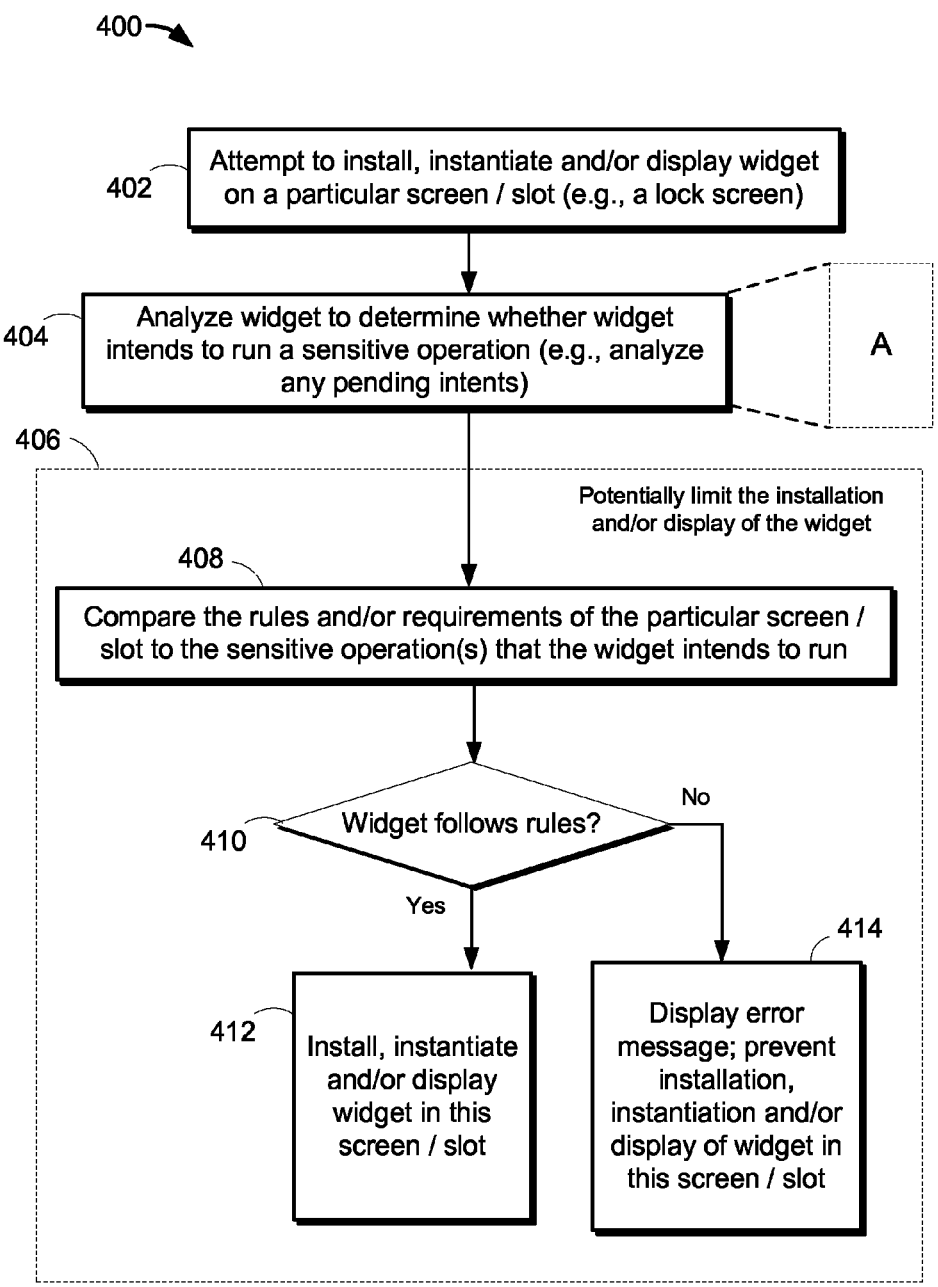

LIMITING THE FUNCTIONALITY OF A SOFTWARE PROGRAM BASED ON A SECURITY MODEL

CROSS-REFERENCE TO RELATED APPLICATIONS

This application claims priority from U.S. Provisional Patent Application No. 61/709,778 filed on Oct. 4, 2012. The disclosure of this provisional application is incorporated by reference herein in its entirety.

FIELD

The present disclosure relates to limiting the functionality of a software program, and more particularly to one or more systems, methods, routines and/or techniques for examining an intended action of a software program and limiting the functionality of the software program based on a security model.

BACKGROUND

Mobile devices such as smartphones have become more advanced. Some mobile devices incorporate a processor that runs computer code, for example, code that implements an operating system (OS) and/or code from a software development kit (SDK). Some mobile devices are capable of running code created by third parties (i.e., parties other than those that wrote the operating system), for example, third-party applications and/or widgets. Some mobile devices include a lock screen that displays on the screen of the mobile device, for example, when a physical button on the mobile device is pressed. A user may be required to enter credentials via the lock screen to gain full access to all the features and functionalities of the mobile device.

Further limitations and disadvantages of conventional and traditional approaches will become apparent to one of skill in the art, through comparison of such systems with some aspects of the present invention as set forth in the remainder of the present application and with reference to the drawings.

SUMMARY

The present disclosure describes one or more systems, methods, routines and/or techniques for limiting the functionality of a software program based on a security model. The functionality of the software program may be limited based on one or more operations that the widget intends to take. One or more systems, methods, routines and/or techniques may include limiting the functionality of a software program (e.g., a widget) that is located on and/or accessible via a lock screen of a mobile device. One or more systems, methods, routines and/or techniques may include preventing a widget from causing an application to perform sensitive actions when a system is in an un-authenticated state. The widget may be allowed to cause the application to perform the sensitive action once the system enters an authenticated state. One or more systems, methods, routines and/or techniques may include preventing a widget from installing and/or displaying on a particular screen and/or slot of a mobile device (e.g., a lock screen) if the widget includes a function that indicates that a sensitive operation will be taken.

These and other advantages, aspects and novel features of the present disclosure, as well as details of an illustrated embodiment thereof, will be more fully understood from the following description and drawings. It is to be understood that the foregoing general descriptions are exemplary and explanatory only and are not restrictive of the disclosure as claimed.

BRIEF DESCRIPTION OF THE DRAWINGS

Several features and advantages are described in the following disclosure, in which several embodiments are explained, using the following drawings as examples.

FIG. 3A depicts an illustration of an example lock screen of a mobile device or smartphone, according to one or more embodiments of the present disclosure.

FIG. 3B depicts an illustration of an example lock screen of a mobile device or smartphone, according to one or more embodiments of the present disclosure.

FIG. 4A depicts a part of a flow diagram that shows example steps in a method for limiting the functionality of a software program based on a security model.

DETAILED DESCRIPTION

Figure 1:
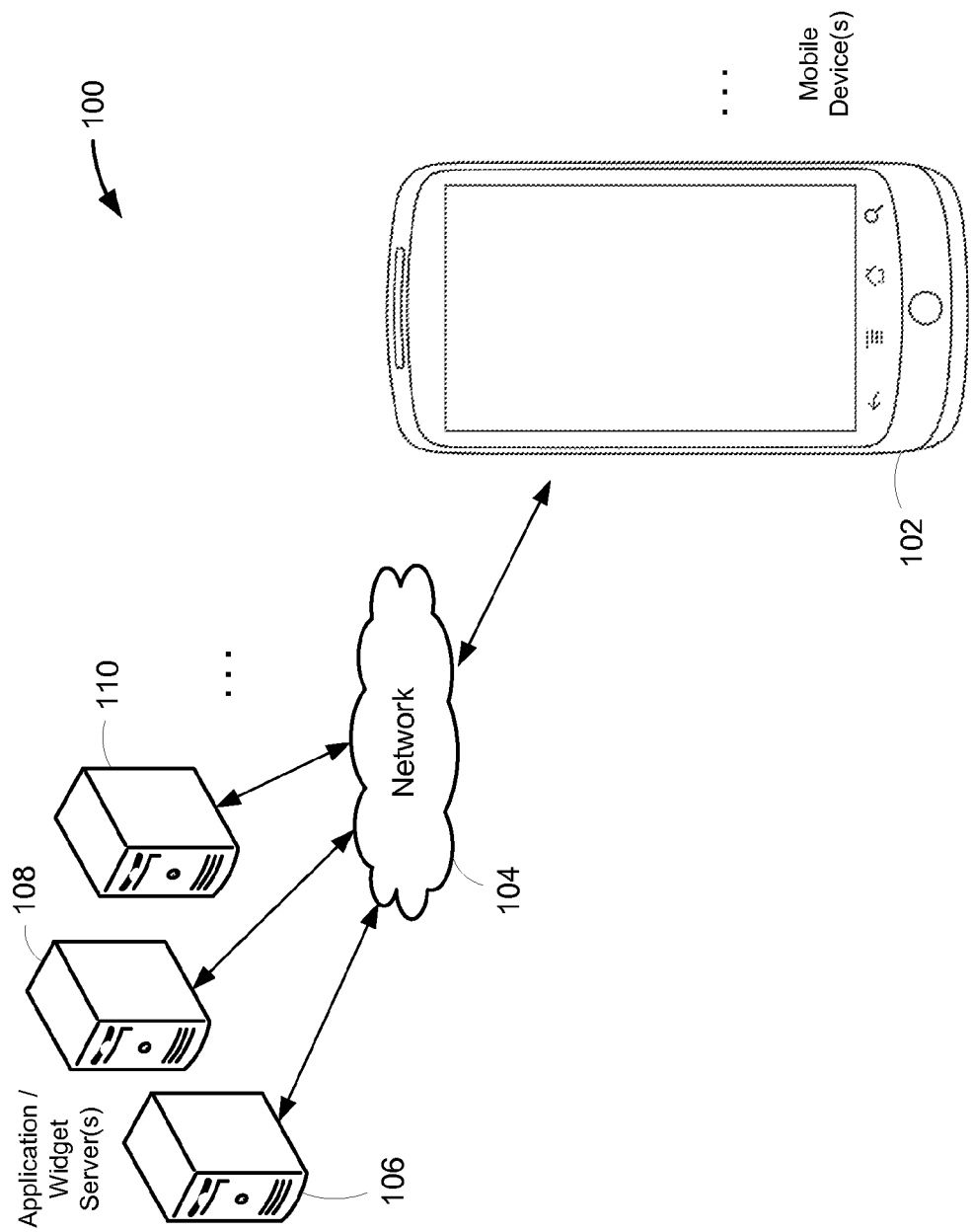
FIG. 1 depicts a block diagram showing example components, connections and interactions of a network setup, where one or more embodiments of the present disclosure may be useful in such a network setup.

Various mobile devices are capable of running code created by third parties (i.e., parties other than those that wrote the operating system), for example, third-party applications and/or widgets. The term "application" may refer to a software program that runs on a mobile device, where the application may be capable of performing various functionalities and/or may store, access and/or modify data or information. The term "widget" may refer to a software program that runs on a mobile device, where the widget may, among other things, provide a user with an interface to one or more applications, for example, an interface that provides the user with abbreviated access to information and/or functionality when compared to the full user interface offered by the application(s). For example, a widget may display an interface that shows a user various pieces of important information related to an application. As another example, a widget may display an interface that shows a user various functionalities or actions that the user may take with respect to an application. A widget and/or the widget's interface may be accessible from a location in the graphical user interface (GUI) of a computer or mobile device, such that a user can quickly find and interact with the widget. For example, a widget may be placed on a desktop screen, taskbar, launch pad, or other easily accessible location of a GUI.

A user may interact with a widget to indicate that a functionality or action related to an application should be taken. A widget may then cause (e.g., via the OS) the application to run or execute the functionality or action. The application may return (e.g., via the OS) information to the widget related to the functionality or action that the application took, and the widget may display the information. It should be understood that this is just one example of an application, a widget and the interaction between them. In order to clearly describe the present disclosure, various descriptions provided herein may refer to widgets and/or applications in a manner similar to that described above. However, this disclosure contemplates other types of widgets, applications and software programs in general. For example, the systems, methods, routines and/or techniques described herein may apply in a similar manner to widgets, application and/or software programs in general that run on a computer, for example, a desktop computer, a mobile computer, a tablet computer, a smartphone, a PDA, a mobile device or the like.

Various widgets (or software programs generally) may attempt to perform various operations, for example, in response to user input. These operations may be intended to cause an application (or another software program generally) to perform an action, for example, an action that may alter, access and/or modify data. In some instances, a widget may attempt to perform a sensitive operation, e.g., an action that would cause an application to access, alter and/or delete sensitive data and/or settings, or may otherwise cause the application to perform an unintended, unauthorized or sensitive action. As one example, a widget related to an email application may attempt to perform an operation that would cause the email application to delete an important email message. As another example, a widget may cause an application to perform an unintended action in response to undesirable user input to the widget. The undesirable user input may come from an unauthorized user of a mobile device, or from a user that accidentally interacts with a mobile device, for example, by accidentally touching the touchscreen of a smartphone (i.e., "falsing").

The present disclosure describes one or more systems, methods, routines and/or techniques for limiting the functionality of a software program based on a security model. One or more systems, methods, routines and/or techniques may include limiting the functionality of a widget based on one or more operations that the widget intends to take. One or more systems, methods, routines and/or techniques may include limiting the functionality of a widget that is located on and/or accessible via a lock screen of a mobile device. One or more systems, methods, routines and/or techniques may include preventing a widget from causing an application to perform sensitive actions when a system is in an un-authenticated state. The widget may be allowed to cause the application to perform the sensitive action once the system enters an authenticated state. One or more systems, methods, routines and/or techniques may be adapted to work with an operating system (OS) and/or software development kit (SDK) that includes a function (e.g., a function invoked by a widget) that indicates an operation that will be taken in the future, for example, when a condition occurs. One or more systems, methods, routines and/or techniques may include preventing a widget from installing and/or displaying on a particular screen of a mobile device (e.g., a lock screen) if the widget includes such a function and the function indicates that a sensitive operation will be taken.

FIG. 1 depicts a block diagram showing example components, connections and interactions of a network setup 100, where one or more embodiments of the present disclosure may be useful in such a network setup. It should be understood that the network setup 100 may include additional or fewer components, connections and interactions than are shown in FIG. 1. FIG. 1 focuses on a portion of what may be a much larger network of components, connections and interactions. Network setup 100 may include one or more mobile devices (for example, mobile device 102), one or more networks (for example, network 104) and a number of servers (for example, application and/or widget servers 106, 108, 110). Network 102 may be a medium used to provide communication links between various devices, such as data processing systems, servers, mobile devices and perhaps other devices. Network 102 may include connections such as wireless or wired communication links. In some examples, network 102 represents a worldwide collection of networks and gateways that use the Transmission Control Protocol Internet Protocol (TCP IP) suite of protocols to communicate with one another. In some examples, network 102 may include or be part of an intranet, a local area network (LAN), a wide area network (WAN) and/or the internet.

Network setup 100 may include one or more mobile devices, for example, mobile device 102. Mobile devices may communicate with one or more application and/or widget servers 106, 108, 110 via one or more networks 104. Mobile device 102 may download one or more third-party applications and/or widgets from one or more application and/or widget servers 106, 108, 110. Mobile device 102 may install and/or execute the one or more third-party applications and/or widgets. Mobile device 102 may also install and/or execute one or more first-party applications and/or widgets (e.g., applications and/or widgets written by the creators of the operating system). Although FIG. 1, and various descriptions herein, may use the example of a mobile device to explain the systems, methods, routines and/or techniques of the present disclosure, it should be understood that other devices may work as well, for example, a desktop computer, a mobile computer, a tablet computer, a smartphone, a PDA or the like.

Figure 2:
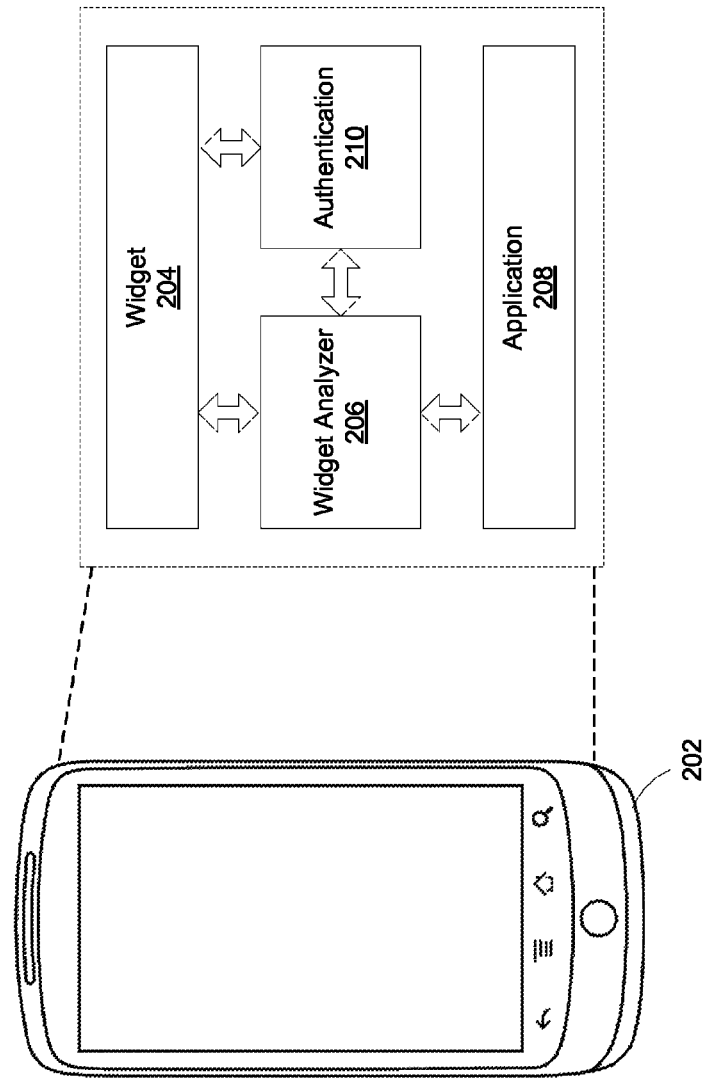
FIG. 2 depicts an illustration of an example mobile device or smartphone, according to one or more embodiments of the present disclosure.

FIG. 2 depicts an illustration of an example mobile device 202 or smartphone, according to one or more embodiments of the present disclosure. Mobile device 202 may be substantially similar to the mobile device 102 of FIG. 1, for example. Mobile device 202 may incorporate a processor that runs or executes computer code, including code that implements an operating system (OS), other native code (i.e., code written by the creator of the smartphone and/or the operating system) and code developed by third parties (e.g., third party applications and/or widgets). Mobile device 202 may also run or execute code from one or more software development kits (SDKs) and/or one or more application programming interfaces (APIs). FIG. 2 depicts various example pieces of code or functions that may run or execute on mobile device 202.

Mobile device 202 may include code related to one or more widgets, for example, widget 204. Mobile device 202 may include code related to one or more applications, for example, application 208. Widget 204 may cause (or attempt to cause) one or more applications (e.g., application 208) to perform one or more actions, for example, an action that may alter, access and/or delete sensitive data. As such, widget 204 may communicate with (or attempt to communicate with) application 208. It should be understood that systems, methods, routines and/or techniques of the present disclosure contemplate a first general software program in place of widget 204 and a second general software program in place of application 208. The illustration of FIG. 2 is just one example.

Mobile device 202 may include code related to a widget analyzer 206. Widget analyzer 206 may analyze and/or examine an intended operation of a widget (e.g., widget 204) and may allow or prevent the operation based on a security model. A security model may refer to a scheme for specifying and enforcing security policies such as access rights for users, applications, processes and/or data. For example, a security model may specify types of data that are considered sensitive data and/or types of actions taken by applications that are sensitive actions. As another example, a security model may specify what types of actions may be run while the device is in various states. As one example of a sensitive operation that may be prevented by widget analyzer 206, widget 204 may attempt to access, display, modify and/or delete local data (i.e., data stored on the mobile device 202) that is determined to be sensitive (e.g., according to the security model). As another example of a sensitive operation, widget 204 may attempt to access, display, modify and/or delete remote data (i.e., data stored on a remote server), for example, via an application. As another example of a sensitive operation, widget 204 may attempt to access a local system process and/or setting that is determined to be sensitive. As another example of a sensitive operation, widget 204 may attempt to access a remote process and/or setting that is determined to be sensitive. Widget analyzer 206 may limit the functionality of a widget (e.g., widget 204) based on one or more actions that the widget intends to take. For example, the widget analyzer 206 may prevent widget 204 from causing application 208 to perform an action, for example, when mobile device 202 is in an un-authenticated state. More generally, widget analyzer 206 may prevent widget 204 from communicating with application 208. The widget analyzer 206 may allow widget 204 to cause the application to perform the action once the system enters an authenticated state. More generally, widget analyzer 206 may allow widget 204 to communicate with application 208.

Widget analyzer 206 may communicate with an authentication module 210 (e.g., a lock screen and/or authentication code) to determine whether and/or when an operation initiated by widget 204 should be allowed to run. Authentication module 210 may allow a user to enter credentials for example, a PIN, pattern, password or the like, optionally, being user-defined. The authentication module 210 may cause the device to enter various states. For example, the mobile device (i.e., the OS and associated code) may be in various states based on whether a user has entered credentials via the authentication module 210. Before a user enters correct credentials, the mobile device may be in an unauthenticated state. After a user enters correct credentials, the mobile device may be in an authenticated state. Widget analyzer may limit the functionality of widget 204 more when the mobile device is in an unauthenticated state, and widget analyzer may allow widget 204 more freedom to run operations when the mobile device is in an authenticated state. Such limitations depending on the state may be defined by a security model.

In one or more embodiments of the present disclosure, widget analyzer 206 may be adapted to work with an operating system (OS) and/or software development kit (SDK) that includes and/or offers a function (e.g., a function invoked by widget 204) that indicates an operation that will be taken in the future, for example, when a condition occurs. The function may indicate information about the operation that will be taken, for example, what data the operation may attempt to access, modify and/or delete. As another example, the function may indicate that the operation will attempt to cause an action related to an application. As another example, the function may be defined by an application and invoked by a widget. For example, an application may define the function and then "lend" the function to a widget so the widget can invoke and/or run the function on behalf of the application. Widget analyzer 206 may analyze and/or examine a widget to determine whether the widget includes or invokes any such functions. If the widget includes or invokes such a function, widget analyzer 206 may analyze the intended operations and/or action and may allow or prevent the operation and/or action, for example, based on a security model.

As one specific example, according to one or more embodiments of the present disclosure, an operating system (and/or SDK) may include and/or offer one or more objects, functions and/or classes of functions that are adapted to indicate an operation that a widget will initiate in the future, for example, in response to a condition being met. In various operating systems, such a function may be referred to as a pending intent or a pending intent function or object. Even though various descriptions provided herein may refer to pending intents and/or related functions, it should be understood that the systems, methods, routines and/or techniques of the present disclosure may apply to similar functions that indicate an operation that a widget will initiate in the future. A widget (or a software program generally) may include or invoke one or more pending intent functions or objects. A pending intent may allow and/or adapt the widget to cause an application to perform an action, or perform an action on behalf of an application. A pending intent may allow and/or adapt the widget to cause an application to perform an action with a particular permission and/or user model. For example, initiating a pending intent may cause an application to perform an action as a specific user, with specific user permissions or with administrator or system permissions.

An operating system may include and/or offer a function that indicates an action should be taken with respect to a particular application. Such a function may be referred to as an intent or an intent function. The term "intent" may refer to an actionable items that specifies an action or operation to be run by or as an application when the intent is activated. An intent may be an object that includes all the information needed to launch an action or operation. The intent may be activated or run by a function, for example, a function called startActivity. The intent may be activated or run by a pending intent function. When an intent is activated, the operating system may run or execute the action, for example, by launching a particular application (e.g., with a particular permission model or as a particular user) and, optionally, causing the application to perform a particular action. As one specific example, an operating system may include an activity manager that is designed and/or configured to accept the name of an application and may launch the application, for example, as a specific user. Once the action has run or executed, the OS may return a result of the action to the function(s) that caused the action or operation to run, for example, an intent function, a pending intent function and/or a widget or other software program. Even though various descriptions provided herein may refer to intents, it should be understood that the systems, methods, routines and/or techniques of the present disclosure may apply to similar functions or actionable items that specify an action or operation to be run by or as an application.

Pending intents, for example, as invoked by a widget, may be related to intents. A pending intent may "wrap" an intent, which means that a pending intent may include a function that may cause an intent to run or activate, for example, a function called PendingIntent.Send. A pending intent may specify a permission and/or user model for an intent, for example, to indicate to the operating system that it should run or execute the action or operation with specific permissions and/or as a specific user. A pending intent may be designed and/or configured to wait for a condition before activating an intent. For example, a pending intent object could wait for or listen for input from a user, for example, input entered via a touchscreen on a mobile device such as pushing a button. As another example, a pending intent could wait for or listen for a time-based condition, such as a time of the day or the expiration of a time period. As a specific example, a pending intent could be designed and/or adapted to detect when a user presses a button, and in response, an intent could be activated, for example, an intent that indicates that a web browser should be launched, or an intent that indicates that a message should be displayed.

Referring to FIG. 2, widget analyzer 206 may analyze and/or examine a widget (e.g., widget 204) to determine whether the widget includes or implements any pending intents, and if so, what action the pending intent is related to. In this respect, widget analyzer 206 may analyze and/or examine a widget to determine what actions or intents the widget intends to run or activate, for example, when a condition is met. For various operating systems, if a pending intent function is used, for example by a widget, the operation or intent that the widget actually runs when the condition of the pending intent is met cannot change. Therefore, analyzing a pending intent function may be a useful way to predict operations that a widget intends to take, for example, to intercept and/or prevent the actions, for example, before the widget indicates to the OS that it should run or execute the action. As one specific example, widget analyzer 206 may analyze one or more sub-functions of a pending intent function to get more information about what the widget intends to do. For example, a pending intent may include a function that indicates what action the pending intent plans to take, for example, a function called pending intent.getActivity. As another example, a pending intent may include a function that indicates that the pending intent plans to cause the OS to run an action or operation, for example, a function called pending intent.isActivity.

Widget analyzer 206 may analyze and/or examine a widget in a static and/or dynamic manner. Static analysis may be useful to analyze a widget before the widget installs, instantiates, runs and/or executes on a mobile device. Dynamic analysis may be useful to analyze a widget, for example, after the widget has been instantiated or has started to run. Widget analyzer 206 may analyze and/or examine a widget in a static manner by analyzing code related to the widget and/or objects created in memory from the code. The code may specify, for example, how the widget interacts with a user and/or other features or functionalities of a mobile device. As one specific example, a widget may include a layout file (e.g., an XML file) that indicates how the user interface and/or window of the widget should display and/or interact. Widget analyzer 206 may analyze and/or examine such a layout file and related objects created by the code to determine whether the widget will use any pending intents, for example, pending intents that activate an intent in response to user input. In order to perform a static analysis of a widget, widget analyzer 206 may expand or inflate a layout file, for example, creating a tree in memory that represents a visual layout or user interface. The widget analyzer 206 may analyze each button in the tree and determine whether it is related to a pending intent.

Widget analyzer 206 may analyze and/or examine a widget in a dynamic manner by analyzing code related to the widget and/or objects created in memory. In this manner, widget analyzer 206 may analyze the widget after the widget has been installed and/or instantiated, and perhaps after the widget has started to run. For example, widget analyzer 206 may analyze a widget after it has been instantiated to identify any pending intents, for example, to prepare for when the pending intent is initiated as a result of user input. As another example, widget analyzer 206 may analyze a widget once a condition (e.g., user input) is detected. In this respect, the widget analyze may analyze the widget based on each user input event.

In some embodiments, the widget analyzer may do some analysis (e.g., scanning the entire widget object) after the widget has been instantiated, but before user input, and then the widget analyzer may perform additional analysis of the widget in response to each user input event. Various other manners of performing dynamic analysis will become apparently after referencing this disclosure.

Widget analyzer 206 may take one or more actions in response to analyzing a widget to determine its intended operations. For example, widget analyzer 206 may limit the functionality of the widget if the widget analyzer determines that one or more intended operations should not be allowed. Widget analyzer 206 may limit the functionality of a widget in various ways, for example, by preventing or delaying the widget from causing an application to perform an action (e.g., by intercepting and discarding or ignoring an attempt to cause an action) or preventing the widget from installing or displaying on a particular screen and/or slot. As another example, widget analyzer 206 may intercept an action initiated by a widget and may hold or delay the action until some condition is met (e.g., until a user enters correct credentials via a lock screen). In this respect, the widget may initiate or start the action (e.g., in response to user input), the widget analyzer may allow the action to launch once the condition is met. As another example, the widget analyzer 206 may cause a window or message to appear on the screen of the mobile device, where the window or message may prompt the user to enter credentials, for example, a user-defined PIN, pattern or password. Once the user enters the password, the widget analyzer 206 may allow the widget to install and/or display, and/or may allow the widget to cause the application to perform the action.

In one or more embodiments of the present disclosure, widget analyzer 206 and/or one or more widgets (e.g., widget 204) may function with a lock screen and/or keyguard 210. In some embodiments, the lock screen and/or keyguard 210 may be a lock screen and/or keyguard function/feature that secures a mobile device such that unauthorized users can only see the lock screen, for example, preventing the unauthorized user from navigating to the desktop, system settings page, applications and the like. In some embodiments, widget analyzer 206 may limit the functionality of a widget (e.g., by delaying actions initiated by a widget) until a user enters credentials (e.g., a user-defined PIN, pattern or password) using an interface (e.g., a virtual keypad on a touchscreen) related to a lock screen and/or keyguard 210. If the user enters the correct credentials, then the widget analyzer 206 may allow the widget more freedom, for example, allowing an action initiated by the widget to launch, for example, causing an application to perform a particular sensitive operation. If the user enters incorrect credentials, then the widget analyzer 206 may maintain the widget in a limited state and/or may discard attempts by the widget to cause an application to perform a particular action.

In one or more embodiments of the present disclosure, widgets (e.g., widget 204) may be designed, programmed and/or adapted to install and/or display on a lock screen, for example, lock screen 210. In these embodiments, the OS running on the mobile device may be adapted to allow widgets (e.g., widgets that meet certain programming guidelines) to display on a lock screen, for example, the main lock screen of the mobile device that prevents unauthorized users from seeing any screen besides the lock screen. In these embodiments, the developer of a widget may design and/or program the widget (for example, using one or more APIs from an SDK) such that it may install and/or display on a lock screen.

For example, developers may certify that certain widgets work with a particular operating system and lock screen, and the widget may include an indication to the operating system (e.g., a tag in a declaration file) that the widget is programmed to run properly on a lock screen.

FIGS. 3A and 3B depict illustrations of an example lock screen (e.g., lock screen 303) that may display on a mobile device 302 or smartphone, according to one or more embodiments of the present disclosure. As can be seen in FIGS. 3A and 3B, one or more widgets (e.g., widgets 304, 306) may install, instantiate and/or display on a lock screen 303. Widgets 1 and 2 may each display a window or layout (see generally, parts 304, 306) on lock screen 303. Each window or layout may include an interface that displays to a user various pieces of information related to one or more applications. The interface may also display to a user various functionalities or actions that the user may take with respect to one or more applications.

Lock screen 303 may include an interactive unlock feature (e.g., unlock features 308 and/or 312) that allows a user to unlock the mobile device 302. For example, referring to FIG. 3A, the unlock feature 308 may include a button or a slider (e.g., a slider that a user may engage by sliding a finger across the screen of the device) that may unlock the device or start the process of unlocking the device. In some embodiments, engaging the unlock feature 308 may cause a further level of authentication to appear on the screen of the mobile device, such as an expanded unlock feature that allows a user to enter a PIN (e.g., see PIN pad 312 of FIG. 3B), password, pattern or the like. As can be seen in FIG. 3B, in some embodiments, the lock screen includes an expanded unlock feature 312 such as a pad that allows a user to enter a PIN, password, pattern or the like. In some embodiments, an expanded unlock feature 312 may display on the lock screen without the need to engage a preliminary unlock feature first (e.g., unlock feature 308). In the embodiment of FIG. 3B, one or more widgets (e.g., widget 304) may display on the lock screen 303 along with the expanded unlock feature 312. In some embodiments, an expanded unlock feature 312 may appear on the lock screen in response to a user attempting to activate a sensitive operation via a widget. In these embodiments, the lock screen may show one or more widgets, and optionally, an unlock feature 308, and once the user attempts to activate a sensitive operation, the lock screen may change to display an expanded unlock feature 312.

As an example of one or more embodiments of the present disclosure in operation, a widget may be installed, instantiated and/or displayed on the lock screen of a mobile device. The device may start in a locked or unauthenticated state. In an unauthenticated state, the widget may display to a user various pieces of information and/or various functionalities (e.g., via various buttons, links or the like). For example, a social networking widget may display one or more notifications (e.g., new messages or updates) and may display one or more buttons or links that allow a user to navigate to an associated application to view content related to the notifications. In an unauthenticated state, a user may be allowed to activate some of the functionalities of the widget. For example, a user may be able to activate a button that moves through multiple pending notifications. In an unauthenticated state, other functionalities may be prevented, restricted, intercepted and/or delayed. In some embodiments, the widget may include or invoke a pending intent that listens for user input, and a widget analyzer may detect such a pending intent and may intercept any sensitive operations initiated by the pending intent. For example, a user may activate a button that attempts to navigate to the application to view a notification. At this point, the widget analyzer may determine that such an operation should be restricted, and the operation may be intercepted and/or delayed, and an authentication module or an unlock feature may be displayed. If the user enters appropriate credentials, the operation that was previously intercepted or delayed may be activated or allowed to launch. For example, after the user enters correct credentials, the user may be taken to the application to view content related to the notification. If the user enters incorrect credentials, the operation that was previously intercepted may be discarded. In this respect, the techniques of the present disclosure may allow a user to interact with an application or data (e.g., via a widget) in a limited respect when a device is locked or unauthenticated. The user may then interact in a more expanded respect with an application and/or navigate directly to the application or data after authenticating.

In some embodiments, lock screen 303 may include a plurality of sub screens. Each sub screen may appear similar to the lock screen examples shown in FIGS. 3A and 3B. Each sub screen may include one or more widgets, and each subs screen may include an unlock feature and/or an expanded unlock feature. Lock screen 303 may allow a user to navigate between the sub-screens. For example, a user may slide or swipe a finger across the screen of the mobile device to move from one sub-screen to the next. Multiple sub-screens may adapt the mobile device 302 to provide a user with access to multiple widgets (e.g., with limited functionality) without unlocking the mobile device. In this respect, a user may have access to various functions (e.g., limited or non-destructive functions) of various devices while the mobile device remains in a locked or unauthenticated state.

Lock screen 303 (or if applicable, each sub-screen) may include one or more slots, where each slot is designated to display a widget. For example, referring to FIG. 3A, lock screen 303 may include a first slot that displays widget 1, a second slot that displays widget 2, and optionally more slots. In some examples, a lock screen or sub-screen may include a single slot such that a widget may occupy the majority or all of the screen of the mobile device. Lock screen 303 may be designed to allow a user to configure the lock screen, for example, by selecting which widgets appear on the lock screen or sub-screen and in which slots.

In some embodiments, a mobile device (e.g., via a widget analyzer) may impose various rules and/or requirements on various lock screens, sub-screen and/or slots, for example by implementing a security model. Rules and/or requirements may specify what types of actions a widget should be allowed to take when it is installed and/or displayed in a particular slot. A widget may be required to conform to the particular rules and/or requirements in order for the OS to allow the widget to install and/or display on the particular lock screen, sub-screen and/or slot. For example, a mobile device may display an error if a user attempts to install a widget in a particular slot and the widget does not conform to the rules and/or requirements of that slot. In some embodiments, one or more lock screens, sub-screens and/or slot may be designated as "protected," meaning that a widget may have to conform to stricter rules and/or requirements. As another example, one or more lock screens, sub-screens and/or slot may be designated as "read-only," meaning that a widget may only display information and may not be configured to accept user input. In this example, a read-only widget (e.g., a social networking widget) may display a notification, and a user may have to unlock the device to interact with the related application. For example, a user may have to unlock the mobile device, navigate to and launch the related application (e.g., a social networking application), and then access the notification via the application.

In some embodiments, a mobile device (e.g., via a widget analyzer) may impose various user and/or permission models on various lock screens, sub-screen and/or slots, for example, by implementing a security model. A widget may be required to conform to the particular user and/or permission model in order for the OS to allow the widget to install and/or display on the particular lock screen, sub-screen and/or slot. For example, a first slot may allow a widget to perform system actions. As a particular example, a first slot may allow widgets to include pending intents that are designed to activate an intent with system or root privileges. In this respect, various widgets displayed on a lock screen may cause actions to be performed as various users or with various permissions. For example, one widget (e.g., a first-party widget such as a clock) may allow system actions, and another widget (e.g., a third-party widget) may only allow actions to be run as a particular user, e.g., with a more restricted list of actions that the widget may activate.

As another example, sub-screen 0 may be the lock screen that displays first by default when a user presses the power button on a mobile device. Sub-screen 0 may impose the strictest rules and/or requirements, for example, because sub-screen 0 may be most prone to incidental or unauthorized input. For example, a user may accidentally push the power button on the mobile device when the phone is in the user's pocket, and the user may proceed to accidentally touch the touchscreen (e.g., falsing). Because of this potential for incidental input from a user, it may be desirable for widgets that display on sub-screen 0 to be limited in the type of actions that the widget may take. Other sub-screens (e.g., sub-screens that a user may have to navigate to via finger swipes and the like) may have looser rules and/or restrictions when compared to sub-screen 0, for example, because it is harder for a user to accidentally navigate to these screens.

Certain embodiments of the present disclosure may be found in one or more methods for limiting the functionality of a software program based on a security model. With respect to the various methods described herein and depicted in associated figures, it should be understood that, in some embodiments, one or more of the steps described and/or depicted may be performed in a different order. Additionally, in some embodiments, a method may include more or less steps than are described and/or depicted.

FIG. 4A depicts a part 400 of a flow diagram that shows example steps in a method for limiting the functionality of a software program based on a security model. In particular, FIG. 4A may show example steps included in limiting the functionality of a software program (e.g., a widget) when a user attempts to install, instantiate and/or display the software program. At step 402, an attempt may be made (e.g., in response to user input) to install, instantiate and/or display a widget on a particular screen and/or slot (e.g., a lock screen) of a mobile device. At step 404, the widget may be analyzed to determine whether the widget intends to run a sensitive operation. In some embodiments, the widget may be analyzed to determine whether it includes or invokes any pending intents. More details about step 404 (e.g., an expanded list of example steps) can be seen in FIG. 4C (see box A in FIG. 4A, and the corresponding box A in FIG. 4C). Referring to FIG. 4A, at step 406, the installation, invocation and/or display of the widget may be limited, for example, based on the results of step 404. More specifically, at step 408, the particular screen and/or slot may have rules and/or requirements regarding acceptable types of operations that a widget may run. These rules and/or requirements may come from a security model, for example, security model 470 of FIG. 4C. At step 408, these rules and/or requirements may be compared to the operations (e.g., sensitive operations) that the widget intends to run. At step 410, if the widget follows the rules (e.g., intends to run acceptable operations) of the particular screen and/or slot, the widget may be installed, invoked and/or displayed at the particular screen and/or slot (step 412). At this point, the widget may run and a user may interact with the widget. At step 410, if the widget does not follow the rules (e.g., intends to run sensitive operations) of the particular screen and/or slot, the widget may be prevented from installing, invoking and/or displaying in the particular screen and/or slot (step 414). Additionally, at step 414, an error message may display on the screen of the mobile device.

Figure 4B:
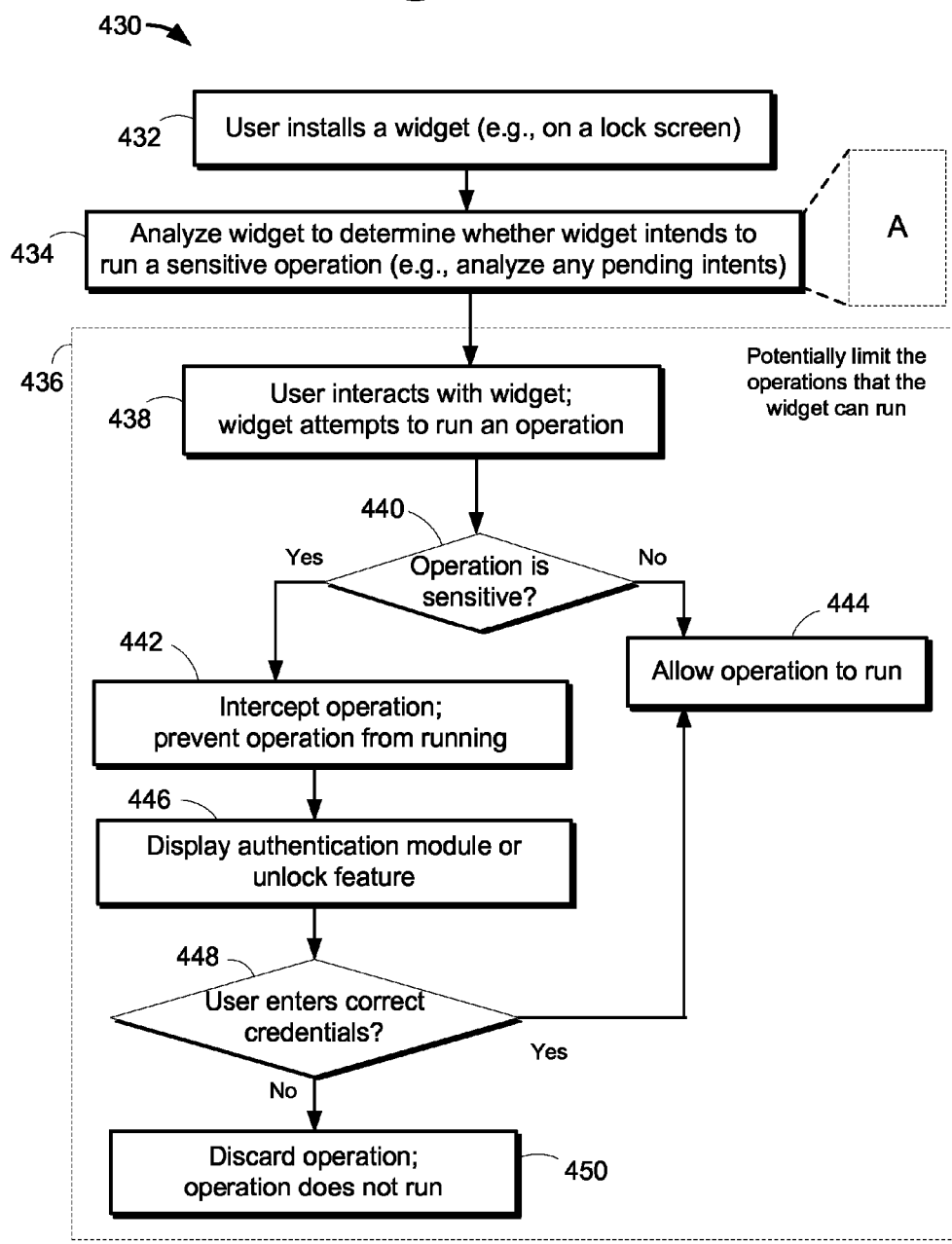
FIG. 4B depicts a part of a flow diagram that shows example steps in a method for limiting the functionality of a software program based on a security model.

FIG. 4B depicts a part 430 of a flow diagram that shows example steps in a method for limiting the functionality of a software program based on a security model. In particular, FIG. 4B may show example steps included in limiting the functionality of a software program (e.g., a widget) when a widget attempts to run an operation, for example, a sensitive operation. At step 432, a user may install and/or invoke a widget, for example, to be displayed on a lock screen. At step 434, the widget may be analyzed to determine whether the widget intends to run a sensitive operation. In some embodiments, the widget may be analyzed to determine whether it includes any pending intents. More details about step 434 (e.g., an expanded list of example steps) can be seen in FIG. 4C (see box A in FIG. 4B, and the corresponding box A in FIG. 4C). Referring to FIG. 4B, at step 436, the functionality of the widget may be limited regarding the operations that the widget may be allowed to run, for example, based on the results of step 434. More specifically, at step 438, a widget may attempt to run or initiate an operation, for example, as a result of a user interacting with the widget. For example, a user may touch a button on a touch screen of the mobile device, for example, causing the widget to initiate an action to instruct an email application to delete an email message. At step 440, it may be determined whether a sensitive operation is attempting to run. This determination may have been partially made at step 434 when the widget was analyzed for intended operations (e.g., what types of operations should be deemed to be sensitive). Alternatively, in some embodiments, the entire determination may be made at step 440, for example, once user interaction has been detected. In these embodiments, the step 434 may effectively be located at step 440. If the operation is not sensitive, the operation may be allowed to run (step 444). At step 442, if the widget is attempting to run a sensitive operation, the operation may be intercepted, and the operation may be prevented and/or delayed (e.g., temporarily) from running. At step 446, an authentication module or unlock feature may be displayed on the screen of the mobile device. The user may be prompted to enter credentials. At step 448, if the user enters incorrect credentials, the operation may be discarded and/or prevented (e.g., permanently) form running (step 450). At step 448, if the user enters correct credentials, the operation may be allowed to run (step 444).

Figure 4C:
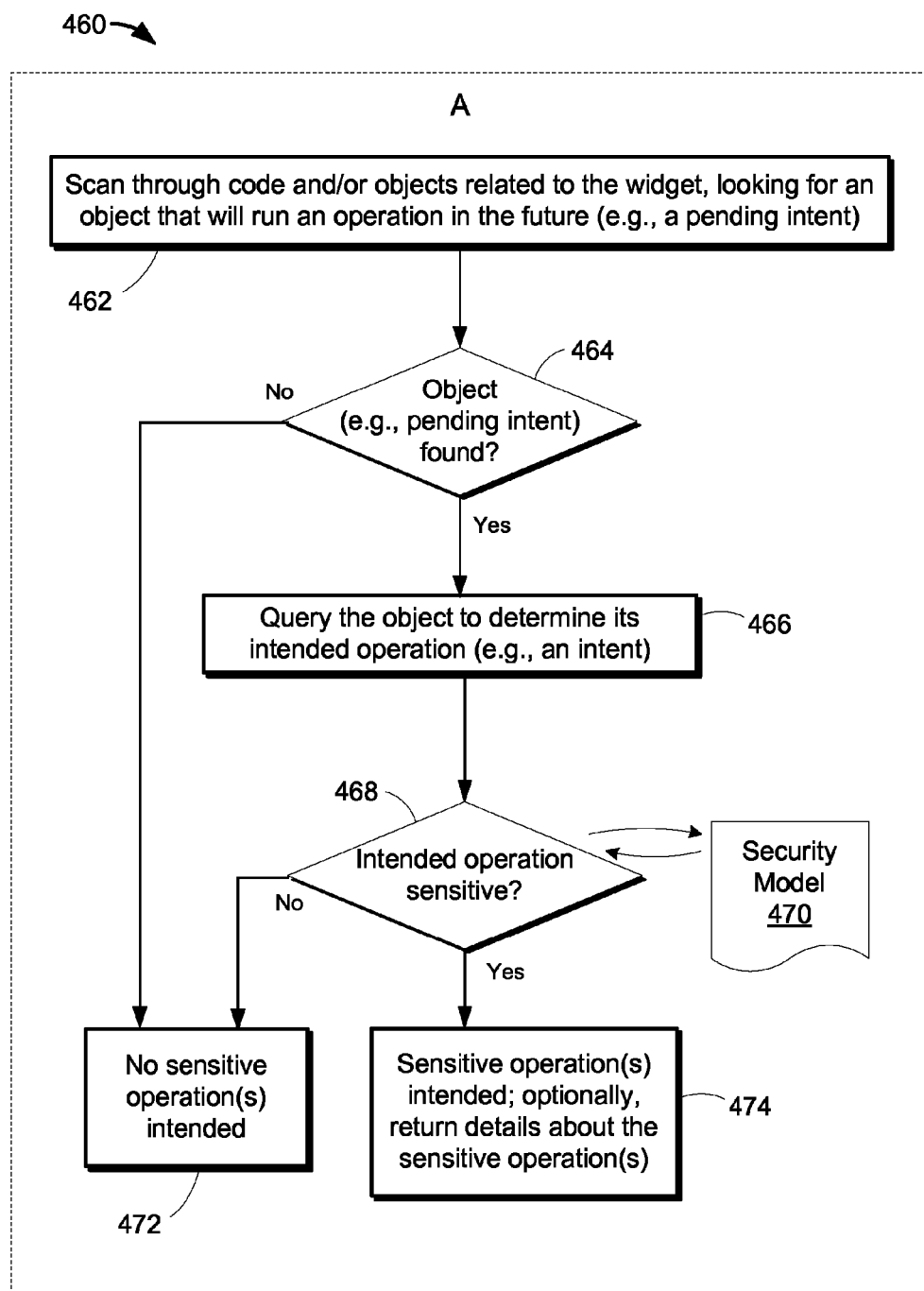
FIG. 4C depicts a part of a flow diagram that shows example steps in a method for limiting the functionality of a software program based on a security model.

FIG. 4C depicts a part 460 of a flow diagram that shows example steps in a method for limiting the functionality of a software program based on a security model. In particular, FIG. 4C may show example steps included in determining whether a widget intends to run a sensitive operation. FIG. 4C may elaborate (e.g., show an expanded list of example steps) on steps 404 and 434 of FIGS. 4A and 4B respectively (see boxes A in FIGS. 4A and 4B, and the corresponding box A in FIG. 4C). Referring to FIG. 4C, at step 462, a routine may scan through the code and/or objects (e.g., coding object expanded in memory) related to the widget and may look for an object that will run an operation in the future, for example, in response to user input. In some embodiments, the routine may scan through the code and/or object looking for any pending intents. At step 464, it may be determined whether such an object and/or code is found. If no such object and/or code is found, part 460 may indicate that no sensitive operations are intended (step 472). At step 466, if such object and/or code is found, the object and/or code may be analyzed and/or queried to determine the intended operation of the object. For example, a function related to the pending intent may be run that asks for the intended operation (e.g., intent). At step 468, it may be determined whether the intended operation is sensitive. A security model 470 may be referenced and/or implemented at step 486 (and optionally, at other steps of the flow diagram shown in FIGS. 4A-4C), where the security model may specify security policies such as access rights for users, applications, processes and/or data. For example, a security model may specify types of data that are considered sensitive data and/or types of actions taken by applications that are sensitive actions. As another example, a security model may specify types of commands that may be run when the device is in various states and/or what types of commands may be run when a widget is installed in various screens and/or slots. If the intended operation is sensitive, part 460 may indicate that no sensitive operations are intended (step 472). At step 474, if the intended operation is sensitive, part 460 may indicate that sensitive operation(s) are intended, and optionally, may provide details about the sensitive operation(s) (step 474).

Various embodiments of the present disclosure describe one or more systems, methods, routines and/or techniques for limiting the functionality of a software program based on a security model. In one or more embodiments, a method may be executed on a data processing system, computer, mobile device, smartphone or the like. The method may include determining whether the data processing system is in an unauthenticated state or an authenticated state. The method may include analyzing a first software program to determine whether the first software program includes code that would cause the first software program to run a sensitive operation. A security model may be used to determine which operations are sensitive when the data processing system is in the unauthenticated state.

The method may include limiting the functionality of the first software program if the data processing system is in the unauthenticated state. Limiting the functionality may include preventing the performance or completion of the sensitive operation. The method may include displaying a lock screen on the data processing system. The first software program may be adapted to be able to install and/or display on the lock screen. The lock screen may be adapted to receive authentication input from a user. The lock screen may be adapted to cause the data processing system to transition from the unauthenticated state to the authenticated state if the authentication input is verified. The method may include receiving, via the lock screen, authenticated input from a user and determine whether the authentication input is verified. The method may include expanding the functionality of the first software program when the authentication input has been verified. Expanding the functionality may include allowing the sensitive operation to complete its intended purpose. Limiting the functionality of the first software program may include detecting when the first software program runs the sensitive operation and intercepting the sensitive operation and preventing it from completing its intended purpose. The sensitive operation may include instructing a second software program to perform a sensitive action, wherein the security model may be used to determine whether an action is a sensitive action. The first software program may be a widget and the second software program may be an application. The sensitive operation may be designed to wait for a condition before it attempts to complete its intended purpose. The condition may be input from a user indicating that the user has interacted with a button on the screen of the data processing system.

In one or more embodiments of the present disclosure, a method may be executed on a data processing system, computer, mobile device, smartphone or the like. The method may include receiving input that indicates that a widget should be installed and/or displayed on a screen and/or slot of the data processing system. The widget may be a first software program that provides access and/or interaction to a subset of information and/or functionality offered by a second software program. The screen and/or slot may be associated with rules and/or requirements regarding types of operations that a widget can run when displayed thereon. The method may include analyzing the widget to determine whether the widget indicates an operation that the widget intends to run once the widget has been installed. The method may include comparing the rules and/or requirements to the operation that the widget intends to run to determine whether the installation and/or display is allowed. The method may include preventing the installation and/or display of the widget if the installation and/or display is not allowed. The widget may utilize a function to run the operation as a particular user and/or with particular permissions. The function may be a pending intent.

One or more embodiments of the present disclosure describe a data processing system that may include one or more memory units that store computer code and one or more processor units coupled to the one or more memory units. The one or more processor units may execute the computer code stored in the one or more memory units to adapt the data processing system to determine whether the data processing system is in an unauthenticated state or an authenticated state. The data processing system may be further adapted to analyze a first software program to determine whether the first software program includes code that would cause the first software program to run a sensitive operation. A security model may be used to determine which operations are sensitive when the data processing system is in the unauthenticated state. The data processing system may be further adapted to limit the functionality of the first software program if the data processing system is in the unauthenticated state. Limiting the functionality may include preventing the performance or completion of the sensitive operation.

The data processing system may be further adapted to display a lock screen on the data processing system. The first software program may be adapted to be able to install and/or display on the lock screen. The lock screen may be adapted to receive authentication input from a user. The lock screen may be adapted to cause the data processing system to transition from the unauthenticated state to the authenticated state if the authentication input is verified. The data processing system may be further adapted to receive, via the lock screen, authenticated input from a user and determine whether the authentication input is verified. The data processing system may be further adapted to expand the functionality of the first software program when the authentication input has been verified. Expanding the functionality may include allowing the sensitive operation to complete its intended purpose. Limiting the functionality of the first software program may include detecting when the first software program runs the sensitive operation and intercepting the sensitive operation and preventing it from completing its intended purpose. The sensitive operation includes instructing a second software program to perform a sensitive action, wherein the security model may be used to determine whether an action is a sensitive action. The first software program may be a widget and the second software program is an application. The sensitive operation may be designed to wait for a condition before it attempts to complete its intended purpose. The condition may be input from a user indicating that the user has interacted with a button on the screen of the data processing system.

The methods, routines and solutions of the present disclosure, including the example methods and routines illustrated in the flowcharts and block diagrams of the different depicted embodiments may be implemented as software executed by a data processing system that is programmed such that the data processing system is adapted to perform and/or execute the methods, routines, techniques and solutions described herein. Each block or symbol in a block diagram or flowchart diagram referenced herein may represent a module, segment or portion of computer usable or readable program code which comprises one or more executable instructions for implementing, by one or more data processing systems, the specified function or functions. In some alternative implementations of the present disclosure, the function or functions illustrated in the blocks or symbols of a block diagram or flowchart may occur out of the order noted in the figures. For example in some cases two blocks or symbols shown in succession may be executed substantially concurrently or the blocks may sometimes be executed in the reverse order depending upon the functionality involved. Part or all of the computer code may be loaded into the memory of a data processing system before the data processing system executes the code.

Figure 5:
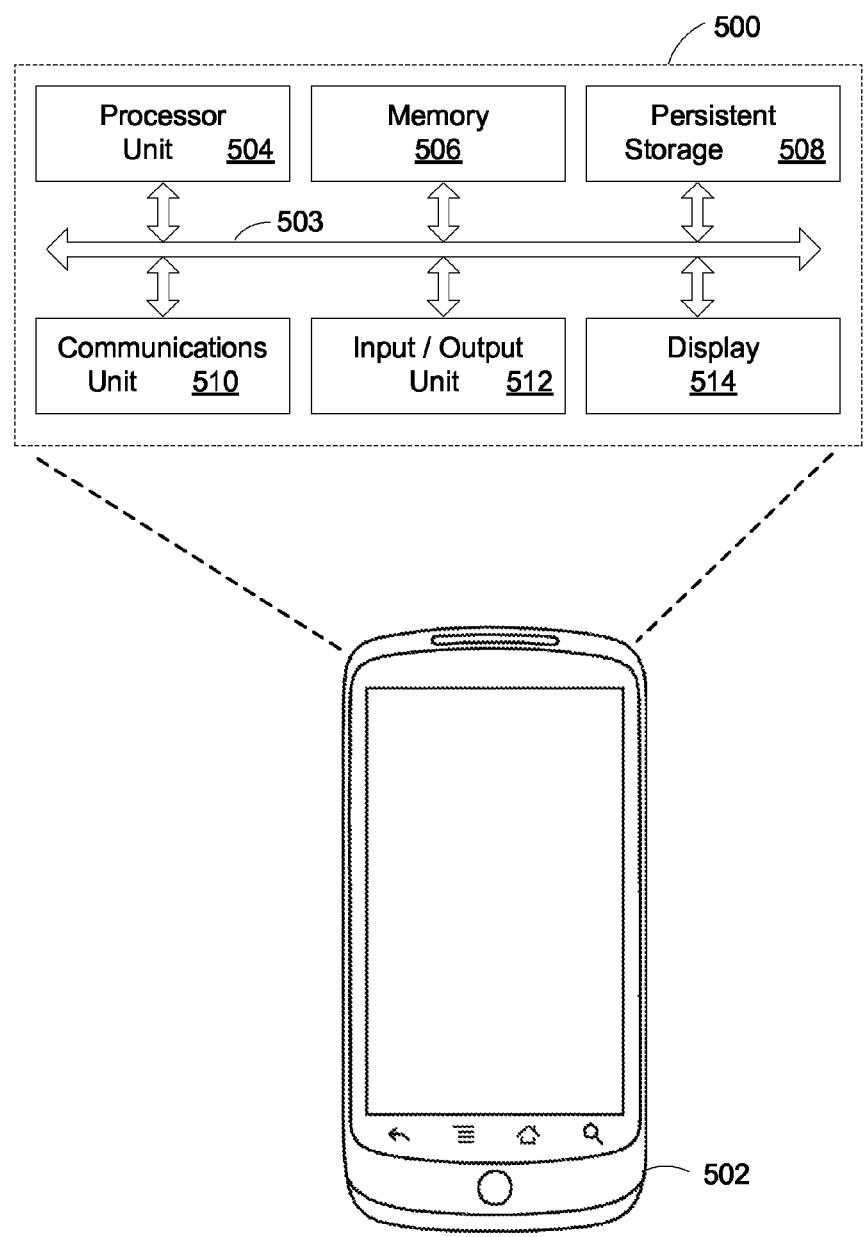
FIG. 5 depicts a block diagram of an example data processing system that may be included within a mobile device or smartphone, according to one or more embodiments of the present disclosure.

FIG. 5 depicts a block diagram of an example data processing system 500 that may be included within a mobile device 502 or smartphone, according to one or more embodiments of the present disclosure. The data processing system 500 may be used to execute, either partially or wholly, one or more of the methods, routines and/or solutions of the present disclosure. In some embodiments of the present disclosure, more than one data processing system, for example data processing systems 500, may be used to implement the methods, routines, techniques and/or solutions described herein. In the example of FIG. 5, data processing system 500 may include a communications fabric 503 which provides communications between components, for example a processor unit 504, a memory 506, a persistent storage 508, a communications unit 510, an input/output (I/O) unit 512 and a display 514. A bus system may be used to implement communications fabric 503 and may be comprised of one or more buses such as a system bus or an input/output bus. The bus system may be implemented using any suitable type of architecture that provides for a transfer of data between different components or devices attached to the bus system.

Processor unit 504 may serve to execute instructions (for example, a software program, an application, a widget, SDK code, native OS code and the like) that may be loaded into the data processing system 500, for example, into memory 506. Processor unit 504 may be a set of one or more processors or may be a multiprocessor core depending on the particular implementation. Processor unit 504 may be implemented using one or more heterogeneous processor systems in which a main processor is present with secondary processors on a single chip. As another illustrative example, processor unit 504 may be a symmetric multi-processor system containing multiple processors of the same type.

Memory 506 may be, for example, a random access memory or any other suitable volatile or nonvolatile storage device. Memory 506 may include one or more layers of cache memory. Persistent storage 508 may take various forms depending on the particular implementation. For example, persistent storage 508 may contain one or more components or devices. For example, persistent storage 508 may be a hard drive, a solid-state drive, a flash memory or some combination of the above.

Instructions for an operating system may be located on persistent storage 508. In one specific embodiment, the operating system may be some version of a number of known operating systems for mobile devices or smartphones (e.g, Android, iOS, etc.). Instructions for applications and/or programs may also be located on persistent storage 508. These instructions may be loaded into memory 506 for execution by processor unit 504. For example, the methods and/or processes of the different embodiments described in this disclosure may be performed by processor unit 504 using computer implemented instructions which may be loaded into a memory such as memory 506. These instructions are referred to as program code, computer usable program code or computer readable program code that may be read and executed by a processor in processor unit 504.

Display 514 may provide a mechanism to display information to a user, for example, via a LCD or LED screen or monitor, or other type of display. It should be understood, throughout this disclosure, that the term "display" may be used in a flexible manner to refer to either a physical display such as a physical screen, or to the image that a user sees on the screen of a physical device. Input/output (I/O) unit 512 allows for input and output of data with other devices that may be connected to data processing system 500. Input/output devices can be coupled to the system either directly or through intervening I/O controllers.

Communications unit 510 may provide for communications with other data processing systems or devices, for example, via one or more networks. Communications unit 710 may be a network interface card. Communications unit 510 may provide communications through the use of wired and/or wireless communications links. In some embodiments, the communications unit may include circuitry that communicates according to various wireless communication standards, for example, cellular standards, WIFI standards, BlueTooth standards and the like.

The different components illustrated for data processing system 500 are not meant to provide architectural limitations to the manner in which different embodiments may be implemented. The different illustrative embodiments may be implemented in a data processing system including components in addition to or in place of those illustrated for data processing system 500. Other components shown in FIG. 5 can be varied from the illustrative examples shown.

The description of the different advantageous embodiments has been presented for purposes of illustration and the description and is not intended to be exhaustive or limited to the embodiments in the form disclosed. Many modifications and variations will be apparent to those of ordinary skill in the art. Further different advantageous embodiments may provide different advantages as compared to other advantageous embodiments. The embodiment or embodiments selected are chosen and described in order to best explain the principles of the embodiments of the practical application and to enable others of ordinary skill in the art to understand the disclosure for various embodiments with various modifications as are suited to the particular use contemplated.

The invention claimed is:

1. A method executed by a data processing system having one or more processors, the method comprising:
   determining that the data processing system is in an unauthenticated state, where authentication input is required to transition from the unauthenticated state to an authenticated state;
   analyzing a first software program to determine whether the first software program includes code that would cause the first software program to run a sensitive operation, wherein:
      the first software program is active or running in the unauthenticated state as a widget located on a lock screen of the data processing system when the data processing system is in a locked state, and
      a security model is used to determine which operations are sensitive when the data processing system is in the unauthenticated state, wherein the security model determines an operation is sensitive based on the operation interacting with data stored in the data processing system or interacting with settings in the data processings system; and
   limiting a functionality of the first software program when the data processing system is in the unauthenticated state, wherein limiting the functionality includes preventing a performance or a completion of the sensitive operation and allowing a performance or a completion of a non-sensitive operation, wherein the performance or the completion of a non-sensitive operation is performed while the data processing system remains in the locked state.

2. The method of claim 1, further comprising providing a lock screen for display on the data processing system, wherein:
   the lock screen is adapted to receive authentication input; and
   the lock screen is adapted to cause the data processing system to transition from the unauthenticated state to the authenticated state based on verification of the authentication input.

3. The method of claim 2, further comprising:
   receiving, via the lock screen, authenticated input and determining whether the authentication input is verified;
   transitioning from the unauthenticated state to the authenticated state based on the authentication input being verified; and
   expanding the functionality of the first software program when the authentication input has been verified, wherein expanding the functionality includes allowing the sensitive operation to complete its intended purpose.

4. The method of claim 1, wherein limiting the functionality of the first software program includes detecting when the first software program runs the sensitive operation; and intercepting the sensitive operation and preventing the sensitive operation from completing its intended purpose.

5. The method of claim 1, wherein the sensitive operation includes instructing a second software program to perform a sensitive action, wherein the security model is used to determine whether an action is a sensitive action.

6. The method of claim 5, wherein the second software program is an application.

7. The method of claim 1, wherein the sensitive operation is designed to wait for a condition before the sensitive operation attempts to complete its intended purpose.

8. The method of claim 7, wherein the condition is indicative of interaction with a button on a screen of the data processing system.

9. A method executed on a data processing system having one or more processors, the method comprising:
   receiving input that indicates that a widget be installed and/or displayed on a lock screen and/or slot of the data processing system, wherein:
      the widget is a first software program that provides access and/or interaction to a subset of information and/or functionality offered by a second software program, and
      the lock screen and/or slot is associated with rules and/or requirements regarding types of operations that a widget runs when displayed thereon;
   analyzing the widget to determine whether the widget indicates an operation that the widget intends to run once the widget has been installed;
   comparing the rules and/or requirements to the operation that the widget intends to run to determine whether the installation and/or display is allowed to determine at least one limited widget function; and
   limiting the at least one limited widget function when the data processing system is in an unauthenticated state, wherein limiting the at least one limited widget function includes preventing a performance or a completion of a sensitive operation and allowing a performance or a completion of a non-sensitive operation, wherein the performance or the completion of a non-sensitive operation is performed while the data processing system remains in a locked state, wherein the at least one limited widget function is sensitive based on the limited widget function interacting with data stored in the data processing system or interacting with settings in the data processing system.

10. The method of claim 9, further comprising preventing the installation and/or display of the widget if the installation and/or display is not allowed.

11. The method of claim 9, wherein the widget utilizes a function to run the operation as a particular user and/or with particular permissions.

12. The method of claim 11, wherein the function is a pending intent.

13. A data processing system, comprising:
   one or more memory units that store computer code; and
   one or more processor units coupled to the one or more memory units, wherein the one or more processor units is configured to execute the computer code stored in the one or more memory units to adapt the data processing system to:
      determine whether the data processing system is in an unauthenticated state or an authenticated state;
      analyze a first software program to determine whether the first software program includes code that would cause the first software program to run a sensitive operation, wherein:
         the first software program is active or running in the unauthenticated state as a widget located on a lock screen of the data processing system when the data processing system is in a locked state, and
         a security model is used to determine which operations are sensitive when the data processing system is in the unauthenticated state, wherein the security model determines an operation is sensitive based on the operation interacting with data stored in the data processing system or interacting with settings in the data processing system; and
      limit a functionality of the first software program if the data processing system is in the unauthenticated state, wherein limiting the functionality includes preventing a performance or completion of the sensitive operation and allowing a performance or a completion of a non-sensitive operation, wherein the performance or the completion of a non-sensitive operation is performed while the data processing system remains in the locked state.

14. The data processing system of claim 13, wherein the one or more processor units execute the computer code stored in the one or more memory units to adapt the data processing system to display a lock screen on the data processing system, wherein:
the lock screen is adapted to receive authentication input; and
the lock screen is adapted to cause the data processing system to transition from the unauthenticated state to the authenticated state if the authentication input is verified.

15. The data processing system of claim 14, wherein the one or more processor units execute the computer code stored in the one or more memory units to adapt the data processing system to:
receive, via the lock screen, authenticated input and determine whether the authentication input is verified; and
expand the functionality of the first software program when the authentication input has been verified, wherein expanding the functionality includes allowing the sensitive operation to complete its intended purpose.

16. The data processing system of claim 13, wherein limiting the functionality of the first software program includes detecting when the first software program runs the sensitive operation; and intercepting the sensitive operation and preventing the sensitive operation from completing its intended purpose.

17. The data processing system of claim 13, wherein the sensitive operation includes instructing a second software program to perform a sensitive action, wherein the security model is used to determine whether an action is a sensitive action.

18. The data processing system of claim 17, wherein the first software program is a widget and the second software program is an application.

19. The data processing system of claim 13, wherein the sensitive operation is designed to wait for a condition before the sensitive operation attempts to complete its intended purpose.

20. The data processing system of claim 19, wherein the condition is an interaction with a button on the screen of the data processing system.

\* \* \* \* \*